Figures 1, 2:
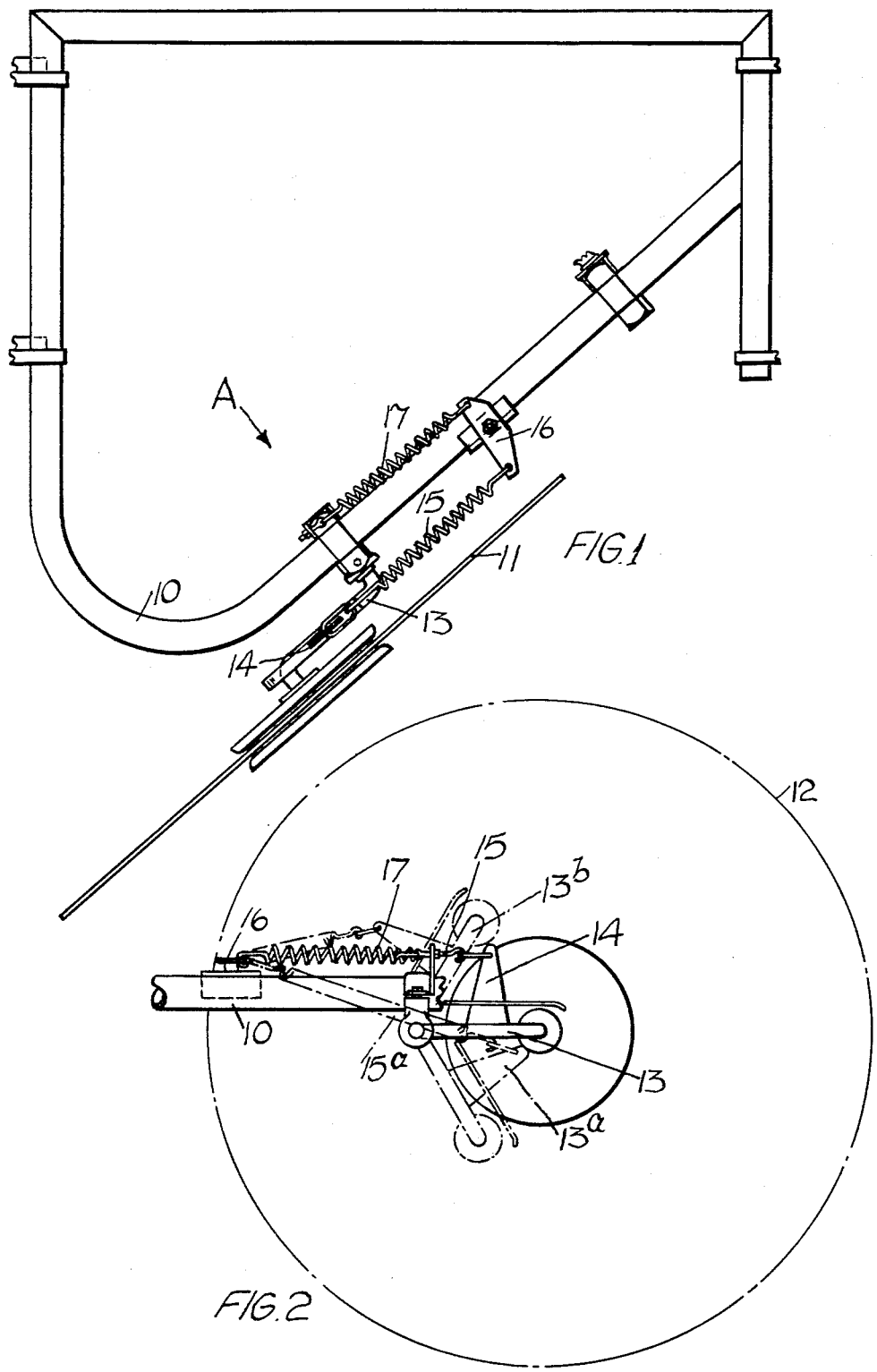

United States Patent Office 3,243,947
Patented Apr. 5, 1966

3,243,947
AGRICULTURAL MACHINES
Charles Goodall and Maurice Goodall, Silverhill, Barton-under-Needwood, Burton-upon-Trent, England
Filed Oct. 14, 1964, Ser. No. 403,878
Claims priority, application Great Britain, Oct. 21, 1963, 41,419/63
1 Claim. (Cl. 56—377)

This invention relates to an agricultural machine of the kind which is adapted to be traversed over ground on which a cut crop or other material is lying, the machine having a frame or beam and one or more tools or rake wheels mounted thereon that are rotatable by engagement with said material and/or the ground and which are arranged to displace said material laterally with respect to the direction of traverse of the machine over the ground, the or each tool being carried by a crank which is pivotable relative to the frame or beam about a horizontal or substantially horizontal axis to permit rise and fall of the tool in conformity with the contours of the ground over which the machine is traversed.

The object of the present invention is to provide an agricultural machine of the kind specified in which there is provided a new or improved form of resilient support for the crank of the or each rotary tool.

In accordance with the invention, there is provided an agricultural machine of the kind specified in which the crank of the or each rotary tool is provided with an arm which is connected to one end of a first tension spring the other end of which is connected to one end of a lever which is pivotally mounted intermediate its ends on the frame or beam of the machine, there being also provided a second tension spring having one end connected to said frame or beam and the other end connected to the other end of said lever.

The invention will now be more particularly described with reference to the accompanying drawings wherein FIGURE 1 is a plan view of part of one example of an agricultural machine constructed in accordance with the invention, and FIGURE 2 is a view looking in the direction of arrow "A" in FIGURE 1.

In the example shown in the drawings the machine is provided with a frame 10 together with at least one tool or rake wheel in the form of a wheel 11 having a plurality of circumferentially spaced tines (the tips of the tines being indicated diagrammatically in FIGURE 2 by broken line 12), said tool being adapted to rotate about a horizontal or substantially horizontal axis and being rotatable by engagement with material lying on the ground and/or the ground. Furthermore said tool is arranged so that its plane is oblique with reference to the direction of advancement of the machine over the ground so that the aforesaid material will be displaced laterally during operation of the machine.

The tool 11 is carried by a crank 13 which is pivotable relative to the frame 10 about a horizontal or substantially horizontal axis to permit rise and fall of the tool in conformity with the contours of the ground over which the machine is traversed. Said crank 13 is provided with an arm 14 which extends in a direction transverse to the length of the crank and the outer end of said arm is connected to one end of a first tension spring 15, the other end of which is connected to one end of a lever 16 which is pivotable about a vertical or substantially vertical axis intermediate its ends on the frame of the machine. There is also provided a second tension spring 17 which is connected at one to said frame and at the other end to the opposite end of said lever 16. Furthermore when the machine is standing on level horizontal ground the springs are arranged so that the crank 13 extends in a position (referred to as the initial or neutral position) in which the lowermost tines of the associated rotary tool apply a light pressure to the ground, the weight of the tool and crank being partially counterbalanced by the springs. Conveniently the aforementioned lever 16 extends in a generally horizontal plane and the second tension spring 17 is arranged so that in the initial or neutral position of the crank both springs will be in tension.

If the machine as above described is traversed over the ground, when said rotary tool 11 meets a hollow or depression in the ground the crank 13 will drop (this position being indicated by broken line 13a in FIGURE 2) and the springs 15 and 17 are so arranged so that the coils of the first tension spring are pulled further open relative to each other (indicated by reference numeral 15a), thereby further stressing the spring and applying a restoring force which tends to move the crank upwardly towards its initial neutral position. In this case, pivotal movement of said lever 16 can if desired be limited or prevented by a suitable stop (not shown) which is adapted to engage one side of the lever and which will prevent the second tension spring being further extended.

Alternatively if the tool 11 encounters a hump in the ground as the machine is traversed over the ground the crank will rise (this position being indicated by broken lines 13b in FIGURE 2), and the tension of the second tension spring 17 will enable said lever 16 to pivot in a direction which will assist the rising of the crank and associated tool. Once the hump has been passed the tool will again be able to descend to its initial or neutral position.

The aforementioned lever 16 may be pivoted at a point which is mid-way along its length or alternatively it may be pivoted at a point which is off-set from its mid-point, the relative strengths of the two tension springs being suitably arranged in either case.

Thus, as previously stated, in the initial or neutral position the weight of the tool and crank will be partially counterbalanced by the aforementioned springs. When the tool passes over a depression or hollow the first tension spring will be extended to increase the counterbalancing force and thereby assist the tool in regaining the initial or neutral position as the machine passes onto level ground, whilst at the same time the tool will remain partially counterbalanced. On the other hand if the tool passes over a hump the tension in the second tension spring will assist the tool in rising and will help to prevent damage being caused to the tines, the tool again being partially counterbalanced. Once the hump has been passed the tool will be able to fall (extension of the second tension spring being insufficient to prevent this) so that the tool can again come into engagement with the ground.

It is, of course, to be understood that a beam may be used if desired instead of the frame 10.

Having thus described our invention what we claim as new and desire to secure by Letters Patent is:

An agricultural machine comprising a frame to be moved over the ground, a crank, said crank having one end pivotally mounted on said frame for movement about a horizontal axis, a ground engaging rake wheel rotatably mounted on the opposite end of said crank, an upstanding arm on said crank intermediate the length thereof, a horizontal lever pivotally mounted intermediate the length thereof on said frame about a vertical axis spaced from the adjacent crank mounting, a first tension spring, said spring being connected between said arm and one end of said lever, and a second tension spring connected between the opposite end of said lever and said frame, said springs being substantially parallel and being disposed in a substantially horizontal plane when said crank is substantially horizontal, whereby said crank and rake wheel is provided with a yieldable support mechanism.

References Cited by the Examiner

UNITED STATES PATENTS

| | | | |
|---|---|---|---|
| 2,712,723 | 7/1955 | Ryan | 56—377 X |
| 3,069,833 | 12/1962 | Van der Lely | 56—377 X |

ANTONIO F. GUIDA, *Acting Primary Examiner.*

M. C. PAYDEN, R. R. KINSEY, *Assistant Examiners.*